United States Patent [19]

Hiorth

[11] Patent Number: 5,678,971

[45] Date of Patent: Oct. 21, 1997

[54] PRESSURE-TIGHT SLUICE

[76] Inventor: Hans Hiorth, Konglestien 8, 3400 Lier, Norway

[21] Appl. No.: 530,106

[22] PCT Filed: Mar. 25, 1994

[86] PCT No.: PCT/NO94/00070

§ 371 Date: Nov. 16, 1995

§ 102(e) Date: Nov. 16, 1995

[87] PCT Pub. No.: WO94/22750

PCT Pub. Date: Oct. 13, 1994

[30] Foreign Application Priority Data

Mar. 26, 1993 [NO] Norway ............... 931140

[51] Int. Cl.$^6$ ............................................. B65G 53/46
[52] U.S. Cl. ..................... 414/220; 222/368; 406/67
[58] Field of Search ............................... 414/219, 220; 222/368, 370; 406/65–68

[56] References Cited

U.S. PATENT DOCUMENTS

| | | | |
|---|---|---|---|
| 2,428,241 | 9/1947 | Pootjes | 222/368 |
| 2,886,216 | 5/1959 | Oholm | 222/368 X |
| 2,933,208 | 4/1960 | Green | 414/220 |
| 3,446,404 | 5/1969 | Mehta | 222/368 X |
| 4,180,188 | 12/1979 | Aonuma et al. | 222/368 |
| 4,784,298 | 11/1988 | Heep et al. | 222/368 X |

FOREIGN PATENT DOCUMENTS

| | | |
|---|---|---|
| 4008407 | 9/1991 | Germany . |
| 4013365 | 10/1991 | Germany . |
| 4218094 | 10/1992 | Germany . |
| 141313 | 11/1979 | Norway . |
| 491030 | 7/1970 | Switzerland . |

*Primary Examiner*—David A. Bucci
*Attorney, Agent, or Firm*—Wenderoth, Lind & Ponack

[57] ABSTRACT

A pressure-tight sluice includes a housing having an inside wall shaped substantially as a torus with a superelliptical cross section. The housing has an inlet and an outlet. A rotor includes an axle rotatable within the housing and a plurality of lamellae extending outwardly therefrom. Each lamella has a superelliptical shape complementary with the inside wall on an outer edge of each lamella is mounted a gasket to seal against the inside wall. Each gasket includes an air hose one end of which communicates via a hole connection in the axle with a compressed air distributor.

7 Claims, 2 Drawing Sheets

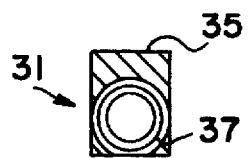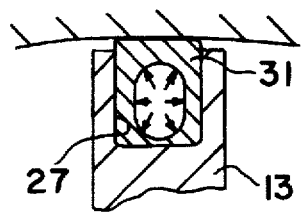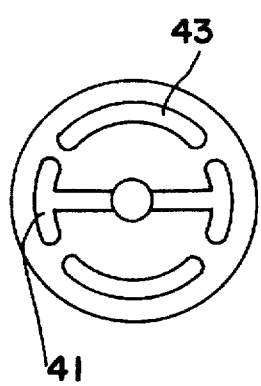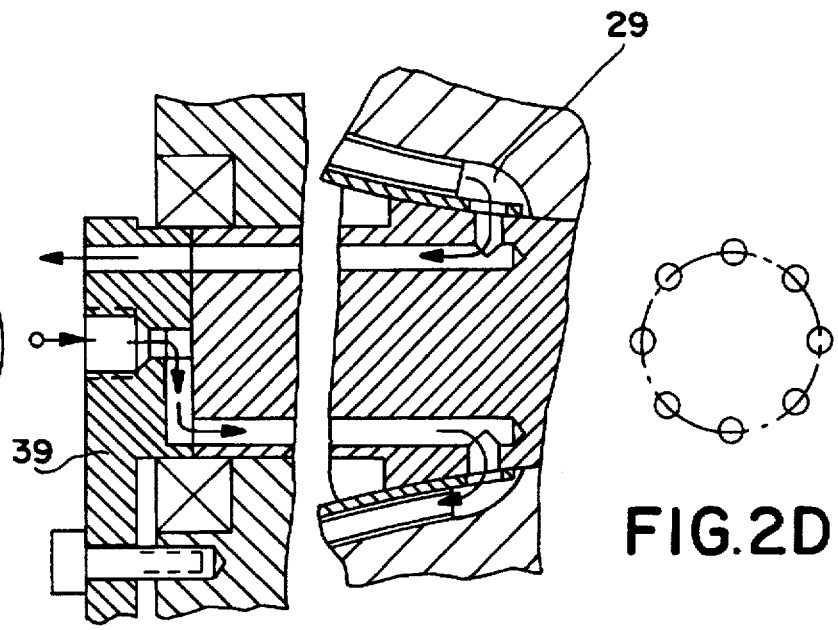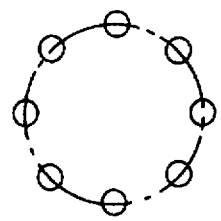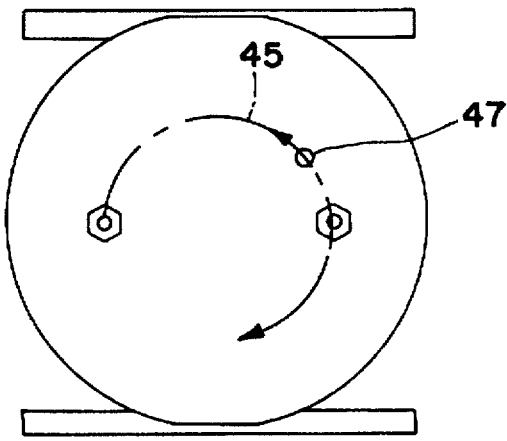

PRESSURE-TIGHT SLUICE

BACKGROUND OF THE INVENTION

The invention relates to sluices for feeding or dosing powder material, e.g. from a silo to a pressure container or to a pneumatic transport installation. The purpose is to increase the degree of filling and rpm by means of a novel design of a housing, an inlet and an outlet, to increase the pressure difference and eliminate air leakage between the housing and a rotor by means of a new sealing arrangement, and to reduce the loss between the amount of output and input air by establishing pressure equalization between return and filling sides in the rotor.

A dominating number of previously known such sluices have a cylindrical housing and a rotor with opposite and downward directed inlet and outlet, where the intersection with the cylinder surface is shaped either circularly or rectangularly. There also are known sluices having ball-shaped housings with a circular or square inlet and outlet. Due to matters related to machining and risk of metallic engagement between rotor and housing during operation, ordinary sluices have a clearance of about 0.1 mm which allows a large amount of leakage.

In order to improve the sealing between the rotor and the housing, there exist readjustable sealing plates made of plastic. There also are known self-adjusting gaskets lying in channel-shaped grooves in outer edges of the rotor blades, against the housing wall, and where a radially displaceable gasket pushes toward the housing wall by means of a spring support on the underside of the gasket. In this connection, reference is made to Norwegian Patent No. 141,313. Regarding the difference in the amount of air between feed-out empty rotor and air in the powder which is fed in, this is a loss which is accepted in previously known sluices.

From DE-A-4008407 is previously known (see FIG. 2 and corresponding text) a pressure-tight sluice with lamella of rectangular shape, where the outer lamella edges are equipped with self-adjusting air hose gaskets for sealing against the surrounding housing wall during lamella rotation. Air is supplied to the air hoses via a central hole in the axle. However, this prior art publication discloses a cylindrically shaped sluice, with obvious sealing problems both in the radial and axial directions. Furthermore, the rapid pressurizing/depressurizing of the gasket hoses (see FIGS. 4–6) is governed by means of air pressure pulsing mechanisms which are unnecessarily complicated.

SUMMARY OF THE INVENTION

In accordance with the invention, the above mentioned deficiencies are remedied by means of a novel geometrical design of the housing and of the inlet and outlet, providing an improved powder flow through the nozzle. Further, the control mechanism for air filling and emptying of the gasket hoses is substantially simplified, leading to a less expensive and more robust construction.

In accordance with the invention there is provided a pressure-tight sluice for feeding powder material, e.g. from a silo to a pressure container or to a pneumatic transport installation, where the sluice comprises a housing having an inlet and an outlet located in opposite to each other. The housing has a rotor with an axle and radially extended lamellae mounted thereon, the lamellae sliding with their outer edges against the inside housing wall in sealing engagement during rotation, thereby providing a number of chambers between the lamellae, the rotor axle and the inside wall. The outer edges of the lamellae are equipped with respective self-adjusting gaskets for sealing against the inside housing wall, and each respective lamellae gasket comprises an underlying, rapidly pressurizable and evacuatable air hose with an elastic wall for rapid control of the gasket pressure against the housing wall. The inside housing wall is shaped substantially like a torus with a superelliptical cross section. Each lamellae has a corresponding superelliptical shape for achieving complementary sealing thereto. One end of each air hose communicates via a hole connection in the axle with a compressed air distributor which thus cooperates with a ring of holes in one end of the axle for filling and emptying the air hoses in correspondence with the instantaneous angular position of the rotor.

According to an additional important feature of the invention, the air loss between the amount of feed-out air and the amount of feed-in air for the rotor is reduced by means of an added transfer line between the two sluice sides. Thus, a line connection for pressure equalization is arranged between the return side of the sluice and the feeding side thereof, respectively defined as those two sections of the housing inner space which are without powder and containing powder during operation. There is also arranged a return valve mounted in the line connection, whereby air can be transferred from the return side to the feeding side.

In order to achieve the particular advantages of the invention, the housing is provided with a shape substantially like a torus having a superelliptical cross section, i.e. the housing inner pace appears by rotating a superellipse with its area and its major axis parallel to and outside the rotation axis. The superellipse is here defined as the curve intermediate between an ellipse and a circumscribed rectangle.

For the inlet and the outlet there has also been chosen a superelliptical shape in the transition zone to the housing cavity, whereby the opening zones will take a relatively smaller part of the circumference than when using circular and rectangular inlets. Further, the outer and critical corners against the end gables in ordinary sluices are avoided regarding filling and emptying. For disassembling purposes the inner cavity of the housing is split in the middle to enable removal of the rotor. In order to maintain the advantage of non-split inlet and outlet flanges, the end pieces are located in or part of the largest part of the housing, while the smallest part is led cylindrically into the largest part having a common gable flange.

In order to obtain a tight seal between rotor and housing, and at the same time a gasket which does not bulge outwardly when it passes the inlet and the outlet, the gasket has an adjustable air pressure as a pressure for sealing, instead of the constant spring support which is previously known. The gasket may consist of a wear-resisting outer band glued to an underlying flexible hose, or the hose and the wear-resisting outer band may be integrated and possibly manufactured by extrusion. The compressed air expands the hose to seal radially against the housing and at the same time to tighten sideways in the lamella groove. When the inlet and outlet openings are passed, pressure is relaxed and gasket bulging is avoided. Air all the way to the gasket as well as return air passes through a separate hole system for each lamella, along through the axle so a distribution flange on the forward side of the rotor. The length of the gasket is equal to the length of the groove in the lamella against the housing, and continues slightly into the lamella and the rotor from both sides for fixing the gasket with a possibility of movement in the lengthwise direction.

In order to reduce the amount of air between feed-out air and air content in powder fed in, the rotor must have a sufficient number of chambers and a sufficiently large sealing part of the circumference for this to take place. In the preferred embodiment of the sluice according to the invention, a line has been added with a return valve which will transfer air from the return side to the feeding side until pressures are equalized. Particularly in sluices operating with a large pressure difference between inlet and outlet, this feature may provide a substantial movement of air.

BRIEF DESCRIPTION OF THE DRAWINGS

Other objects, features and advantages of the present invention will be apparent from the following detailed description, taken with the accompanying drawings, wherein:

FIG. 2A is a partial cross sectional view of one end of an axle of the sluice, the upper half of FIG. 2A being as viewed along a vertical section of FIG. 1A, and the lower half of FIG. 2A being as viewed along a horizontal section of FIG. 1A;

FIG. 2B is a view similar to FIG. 2A, but of the opposite end of the axle;

FIG. 2C is an end view of a distribution flange;

FIG. 2D is a schematic end view of the relative orientations of air distribution holes through the sluice;

FIG. 2E is an enlarged sectional view of a gasket of the invention;

FIG. 2F is an enlarged sectional view showing such gasket mounted within a groove in an outer edge of a lamella; and FIG. 3 is a schematic end view of the sluice with a line connection and return valve.

DETAILED DESCRIPTION OF THE INVENTION

Figure 1A:
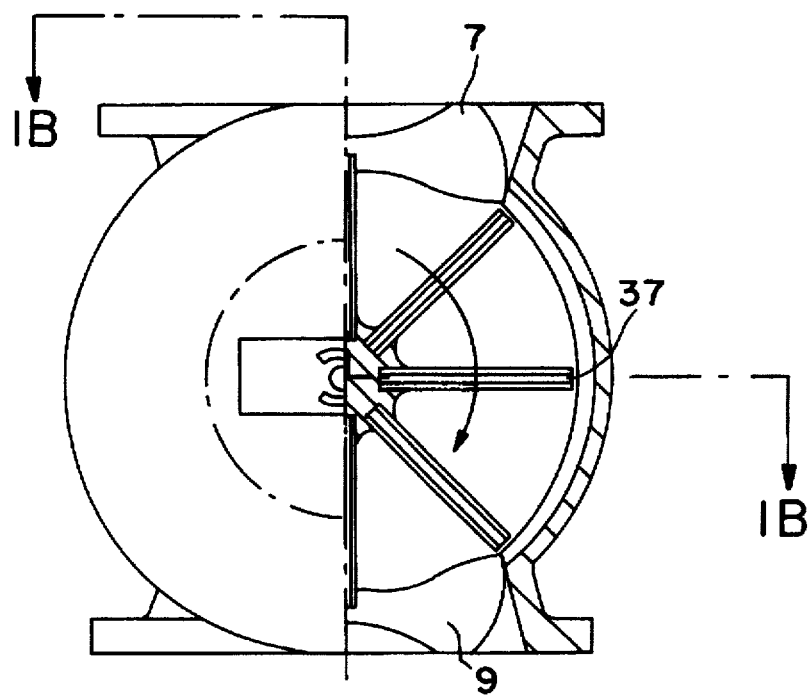
FIG. 1A is a partial cross sectional view of a sluice in accordance with the present invention, taken along line 1A—1A in FIG. 1B.
Figure 1B:
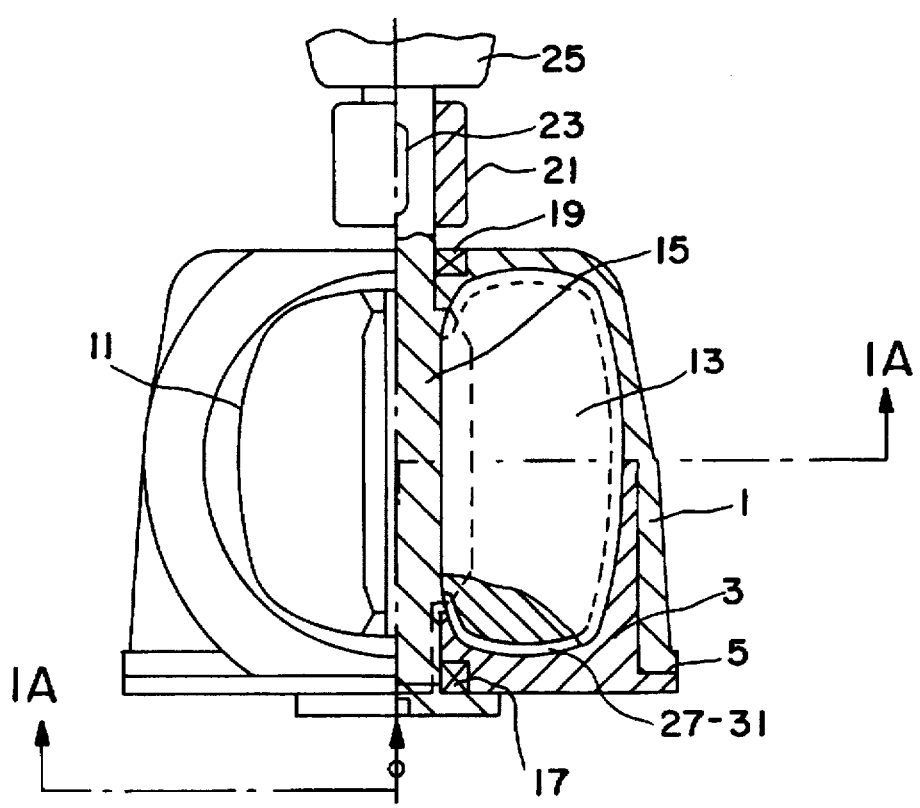
FIG. 1B is a partial sectional view taken along line 1B—1B of FIG. 1A.

Sluice housing parts 1 and 3 in FIGS. 1A and 1B form an inside superelliptical torus-shaped cavity which is split along the middle inside, housing part 3 being led into part 1 with a common flange 5. Inlet 7 and outlet 9 are included in part 1 and having circular flanges with approximately superelliptical transitions 11 toward the sluice cavity. The rotor is shown having eight lamellas 13 which in this case are fixed to the axle that is supported by tight ball bearings 17 and 19. At the rear side of the sluice there is an axle outlet with a coupling 21 and a wedge connection 23 to a stepless variator drive with a gear 25. In each lamella 13 there is a gasket groove 27, which is shown in FIG. 2F with a gasket 31 therein. The gasket 31 seals against housing parts 1 and 3, and both groove and gasket are extended in both ends with pockets 29.

The gasket 31 in the embodiment shown in FIGS. 2E and 2F is glued together from a hard, wear-resisting band 35 and a soft, elastic rubber hose 37 which on receiving an excess pressure will expand and push the wearing surface of band 35 sealingly toward the housing wall and itself tighten against the groove in the lamella.

FIGS. 2A–2C show how the gasket air, which should have a pressure 10014 200 kPa (1–2 bar) in excess of the maximum sluice pressure, is conducted to the gasket from a distributed flange 39 having milled grooves 41. Correspondingly, the air is evacuated through the distribution flange 39 when the lamellae pass the inlet and outlet openings 7 and 9, through milled hole grooves 43.

In FIG. 3 the sluice is seen in a front view with a line connection 45 and return valve 47. When the lamellae pass the mid-position, air having outlet pressure will flow through line 45 until pressures in both sides are equalized.

The amount of air flowing from one side to the other will, in sluices operating with a large pressure difference, mean a large relative saving of air when the sluice is pressure-tight in other respects.

I claim:

1. Pressure-tight sluice for feeding powder material, said sluice comprising:

a housing having an inlet and an outlet located in opposition to each other;

a rotor rotatably mounted in said housing and including an axle and radially extended lamellae mounted thereon, said lamellae sliding with outer edges thereof against an inside wall of said housing in a sealing engagement during rotation, thereby providing a number of chambers between said lamellae, said rotor axle and said inside wall, said outer edges of said lamella having respective self-adjusting gaskets for sealing against said inside wall, each said respective lamella gasket comprising an underlying, rapidly pressurizable and evacuatable air hose with an elastic wall for rapid control of pressure of said gasket against said inside wall;

said inside wall being shaped substantially as a torus with a superelliptical cross section;

each said lamella having a corresponding superelliptical shape for achieving complementary sealing with said inside wall; and one end of each said air hose communicating via a hole connection in said axle with a compressed air distributor which thus cooperates with a ring of holes in one end of said axle for filling and emptying said air hoses in correspondence with an instantaneous angular position of rotation of said rotor.

2. A sluice in accordance with claim 1, wherein each said lamella gasket fits within a peripheral groove in each respective said lamella.

3. A sluice in accordance with claim 1, wherein each said air hose is integrated with the respective said gasket by said gasket comprising an extruded air hose with a solid thickening as a wearing part on an outer side thereof.

4. A sluice in accordance with claim 1, wherein each said gasket comprises the respective said air hose and an overlying part of wear-resisting material attached thereto.

5. A sluice in accordance with claim 1, wherein said housing inlet and said housing outlet each have a superelliptical shape in an area of intersection thereof with said inside wall.

6. A sluice in accordance with claim 1, wherein said housing is internally split in an axial middle thereof and includes a first housing part having said inlet and said outlet including flanges, and a second housing part adapted to be slid into said first housing part and fixed thereto by a common end flange.

7. A sluice in accordance with claim 1, further comprising a line connection, for pressure equalization, arranged between a return side of said sluice and a feeding side thereof, respectively defined as two sections of the housing inner space which is without powder and containing powder during operation, and a return valve mounted in said line connection, whereby air can be transferred from said return side to said feeding side.

* * * * *